Feb. 1, 1966  L. J. GROSSWILLER, JR., ETAL  3,232,559
AIR SHIFTER CONSTRUCTION FOR PNEUMATIC SYSTEMS
Filed March 11, 1964  4 Sheets-Sheet 1

INVENTORS
Leo J. Grosswiller, Jr.
and Dale O. Kettering
BY
Frease, Bishop, Johns & Schick
ATTORNEYS

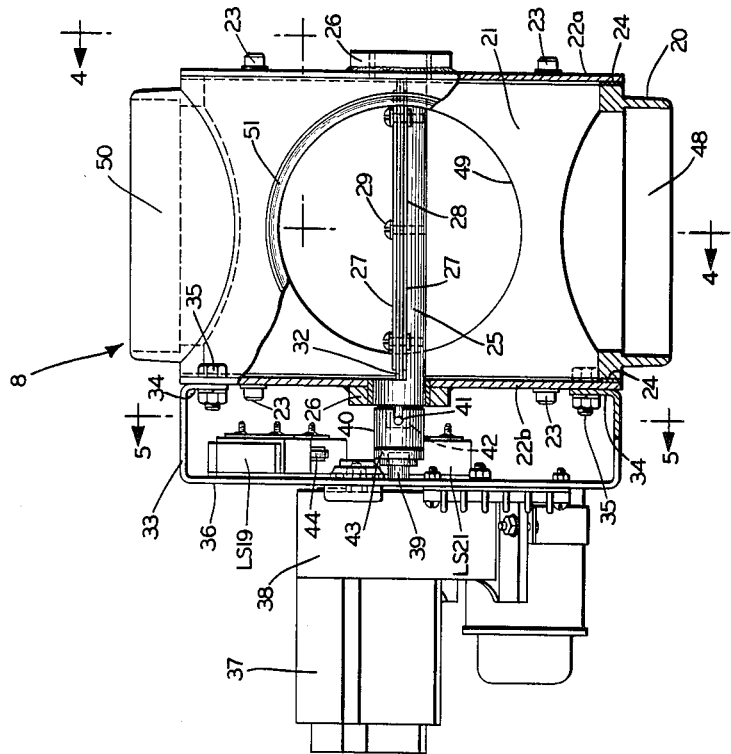
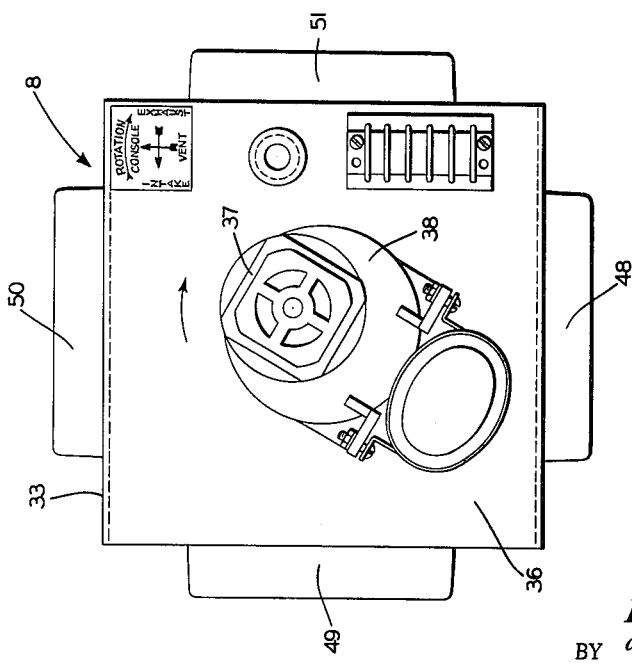

Feb. 1, 1966    L. J. GROSSWILLER, JR., ETAL    3,232,559
AIR SHIFTER CONSTRUCTION FOR PNEUMATIC SYSTEMS
Filed March 11, 1964                                           4 Sheets-Sheet 3

INVENTORS
Leo J. Grosswiller, Jr.
BY and Dale O. Kettering

Frease, Bishop, Johns & Schick
ATTORNEYS

Feb. 1, 1966   L. J. GROSSWILLER, JR., ET AL   3,232,559
AIR SHIFTER CONSTRUCTION FOR PNEUMATIC SYSTEMS
Filed March 11, 1964                           4 Sheets-Sheet 4

INVENTORS
Leo J. Grosswiller, Jr.
BY and Dale O. Kettering

Frease, Bishop, Johns & Schick
ATTORNEYS

3,232,559
AIR SHIFTER CONSTRUCTION FOR PNEUMATIC SYSTEMS
Leo J. Grosswiller, Jr., East Canton, and Dale O. Kettering, Canton, Ohio, assignors to Diebold, Incorporated, Canton, Ohio, a corporation of Ohio
Filed Mar. 11, 1964, Ser. No. 350,968
6 Claims. (Cl. 243—2)

The invention relates to pneumatic systems in which a carrier is moved rapidly by air pressure or vacuum through a conveyer tube between one station at one end and another station at the other end of the conveyer tube; and more particularly the invention relates to an air shifter construction cooperatively arranged with a blower selectively to supply pressure or vacuum to the pneumatic tube system for movement of a carrier through the pneumatic tube system in one direction or the other between the stations, or to cut off the pressure or vacuum supply to the system when a carrier is to be retained at one of the stations, which air shifter construction has a simplified construction with enhanced reliability and serviceability.

Pneumatic tube carrier systems have been used advantageously for conducting banking services because of the rapidity with which banking transaction media (such as deposit and withdrawal components which may include coin, paper money, deposit, checks, deposit slips and other similar articles) may be moved from a teller's console or station within a bank building at one end or terminal of the pneumatic tube to a customer's station or kiosk at the other end or terminal of the pneumatic tube remote from the teller's console and accessibly located for walk-up or drive-up banking transactions; and in which two-way oral and visual communication is established and maintained between the teller's console and the customer's kiosk.

Equipment for conducting such banking services has included television cameras and receivers for establishing the two-way visual communication between the teller's console and customer's kiosk, and is known as television banking equipment.

Such equipment has used a blower, control means for the blower and connections between the blower and pneumatic tube system for supplying or cutting off the supply of pressure or vacuum to the pneumatic tube. The control means commonly is called an air shifter. One type of air shifter which has been used is shown in the co-pending Grosswiller et al. application, Ser. No. 29,485 filed June 25, 1963. This type of air shifter essentially involves a three-position, piston-type slide valve power operated by a reversing drive motor and reciprocating mechanism connections.

There have been problems involved in the construction, operation, use, servicing and repair of such three-position, piston-type slide valve air shifters related to the maintenance of seals for the reciprocating slide valve, to the control of adjustments for accurately positioning the slide piston in each of its three positions, and to the use of reversing motors and reciprocating mechanisms; and also related to malfunctioning incident to failure of seals and slight wear or slight changes in relationship between components affecting adjustments necessary to be maintained.

Other types of air control devices which generally have been used in pneumatic tube systems in the past sometimes have included a rotary valve rather than a reciprocating piston slide valve. These rotary valves have been oscillated between various valve positions, and have used reversing drives or reciprocating mechanisms to oscillate the rotary valves between valve positions. Again, such prior constructions involve some of the same problems enumerated above with respect to three-position, piston-type slide valve air shifters.

Accordingly, it is an object of the present invention to provide a new air shifter construction for pneumatic tube systems of a rotary type with a vane or shutter which always rotates in one and the same direction, thereby eliminating any requirement for a reversing drive for the air shifter means which normally has been required in prior constructions.

Moreover, it is an object of the present invention to provide a new air shifter construction for pneumatic tube systems comprising a rotary valve type device with shutter means provided with flexible seals, in which the shutter means always rotates in one direction and thus avoids problems in maintaining a seal between the shutter and the valve body and provides reliable sealing for long periods of time.

Moreover, it is an object of the present invention to provide a new air shifter construction for pneumatic tube systems including a power driven shutter rotating in one direction successively from one position to another in an operation cycle, in which the operation of the shutter is controlled by cam means associated with the shutter, and by a series of limit switches, one for each position in the cycle of operation.

Furthermore, it is an object of the present invention to provide a new air shifter construction for pneumatic tube systems which is very simple in construction, which may be assembled, adjusted and maintained with the simplest of operations and with minimum repair problems, and which is relatively inexpensive as compared with prior devices used for accomplishing air shifting in pneumatic tube systems.

Also, it an object of the present invention to provide a new air shifter construction for pneumatic tube systems which achieves simplicity, and low construction, maintenance and repair costs by utilizing a simple motor for power operation of the air shifter shutter and driving the shutter in one direction only, by eliminating drive reversing mechanisms, and by utilizing simple contactor control limit switches, a valve body of simple structure and simple and reliable seals for the one direction movable shutter.

Moreover, it is an object of the present invention to provide a new air shifter construction for pneumatic tube systems having a vane or shutter which rotates in one direction only, providing four operative shutter positions in rotating through 180°, providing for repeating the four operative positions during subsequent shutter rotation through another 180°, and providing symmetrical double ended cam means coordinated with the shutter operatively associated with four limit switches, one for each of the four operative positions, whereby one end of the cam means and the limit switches controls shutter operation throughout 180° of shutter rotation, and whereby the other end of the cam means controls shutter operation in an identically repeated manner throughout a second 180° movement of the shutter in rotating through 360°.

Finally, it is an object of the present invention to provide a new air shifter construction for pneumatic tube systems which has a substantially reduced cost, which requires substantially less adjustment and maintenance, and which has increased reliability as compared with prior constructions; and which achieves the stated objects in a simple, effective and inexpensive manner, and solves problems and satisfies needs existing in the art.

These and other objects and advantages apparent to those skilled in the art from the following description and claims may be obtained, the stated results achieved, and the described difficulties overcome, by the apparatus, combinations, parts, elements, subcombinations, arrangements, constructions and controls which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improved air shifter construction may be stated in general terms as including in a pneumatic tube conveyer system in which a carrier is conveyed or moved in either direction from one to the other terminal of a pneumatic tube by motive pressure, either pressure or vacuum, supplied through the tube to the carrier, and in which a source of motive pressure, preferably a blower, communicates with the tube; rotary air shifter valve means communicating with the blower and the tube; the air shifter valve means including a valve body, a shutter having opposite valving edges rotatable in one direction in said valve body, a drive motor connected with the shutter for rotating the shutter in one direction, and flexible sealing means at the edges of the shutter engaging the valve body during shutter rotation; the valve body being provided with four openings spaced 90° apart radiating from the center of rotation of the shutter within the valve body; the valving edges of the shutter wiping across said four openings successively during shutter rotation; two opposite openings communicating one each with the intake and exhaust of the blower, the other two opposite openings communicating one each with the atmosphere and the pneumatic tube; four control limit switches associated with the shutter and connected with the power supply circuit for said shutter drive motor, said switches being provided with contact actuators located 45° apart circumferentially of the axis of the rotation of the shutter; a symmetrical double-end control cam on the the shutter drive shaft, the ends of the cam successively passing and actuating one after another of said switches during shutter rotation; whereby during a complete revolution of the shutter, the shutter twice repeats a cycle of valve operation, each cycle involving shutter stoppage by said limit switches at four successive positions 45° apart, the four positions in order comprising a position supplying pressure to the pneumatic tube, a neutral position, a position supplying vacuum to the tube, and a second neutral position; and control means for said motor for starting operation thereof when the shutter is stopped in either of the neutral positions.

By way of example, an embodiment of the new air shifter construction is illustrated in the accompanying drawings forming part hereof in which:

FIG. 2 is a side view, with portions in longitudinal section, of the improved air shifter valve body, drive and control;

FIG. 3 is a left end view of the device shown in FIG. 2;

Similar numerals refer to similar parts throughout the drawings.

Figure 1:
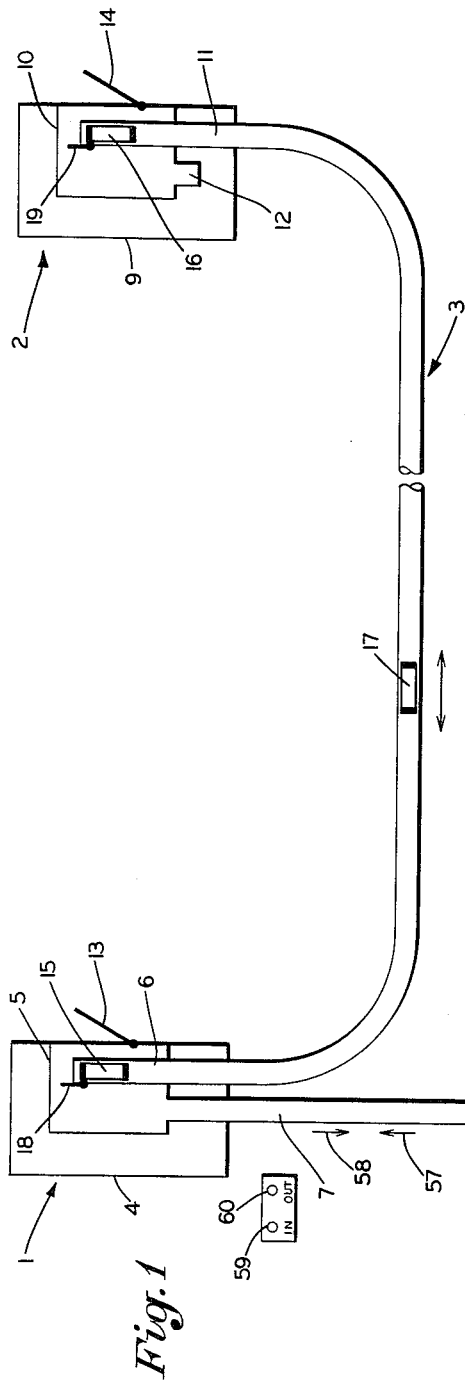
FIGURE 1 is a diagrammatic view of a pneumatic tube conveyer system for television banking equipment equipped with the improved air shifter construction.

A pneumatic tube conveyer system for conducting banking services is illustrated diagrammatically in FIG. 1 and may include a teller's console or station indicated generally at 1 and a kiosk of customer's station indicated generally at 2 with a pneumatic tube indicated generally at 3 connecting stations 1 and 2.

Teller's console 1 is conveniently located within a bank building while kiosk 2 is located remotely from console 1 outside the bank building at a convenient place accessible for a customer to transact banking business at the kiosk. Console 1 and kiosk 2 may be provided with sound and television equipment (not shown) for establishing and maintaining two-way oral and visual communication between the console 1 and kiosk 2.

Console 1 may include a main housing 4 having a pressure housing 5 formed therein. One end 6 of pneumatic tube 3 terminates within pressure housing 5, and pressure housing 5 communicates through conduit 7 with the improved air shifter indicated generally at 8.

Kiosk 2 similarly includes a housing 9 having a pressure housing 10 formed therein, and the other end 11 of pneumatic tube 3 terminates in pressure compartment 10. An opening 12 communicates between pressure compartment 10 and the atmosphere.

Console 1 and kiosk 2 are provided, respectively, with carrier access door means 13 and 14 located opposite the position at which a captive carrier is located when present at either one of the terminals. A carrier is illustrated at 15 positioned at console 1, is also illustrated at 16 positioned at kiosk 2, and is similarly illustrated diagrammatically at 17 travelling between the stations. Although representations of carriers appear at the three locations 15, 16 and 17, there is only one captive carrier travelling in the tube 3, the three illustrations of the one carrier serving only to indicate its position at the several locations.

A carrier arrival switch actuator 18 is engaged by the carrier when it arrives at console position 15, and a similar carrier arrival switch actuator 19 is engaged by the carrier when it arrives at kiosk position 16.

Referring particularly to FIGS. 2, 3, 4 and 5, the improved air shifter includes a valve body 20 having a cylindrical wall 21 closed by face plate end walls 22a and 22b. The plates 22a and 22b are preferably bolted at 23 to the valve body 20 with usual gasket seals 24.

A shutter shaft 25 concentric with cylindrical wall 21 is journalled in bearings 26 carried by face plates 22a and 22b. Shutter plates 27 having preferably a series of shutter sealing pads 28 clamped therebetween are mounted at 29 on shutter shaft 25. The sealing pads 28 project at 30 beyond the valving edges 31 of shutter plates 27 forming flexible seals which wipe at opposite valving edges along the entire cylindrical inner surface of the cylindrical portion 21 of valve body 20 at locations spaced 180° apart. These flexible seal portions 30 are curved, as shown, to adapt to the valve body surface as the shutter shaft 25 rotates in the direction of the arrow indicated in FIG. 4. Lateral edge portions of the sealing pads 28 indicated at 32 in FIG. 2 project from the side edges of shutter plates 27 and seal against the inner faces of face plates 22a and 22b.

A U-shaped mounting panel bracket 33 has inturned flanges 34 bolted at 35 to the face plate 22b, and a panel portion 36 on which a drive motor 37 and suitable gearing in a gear housing 38 are mounted. Drive shaft 39 projects from housing 38 through panel portion 36 toward face plate 22b and has a coupling member 40 secured thereto which has driving connection through pin 41 with stub shaft 42 of shutter shaft 25.

Figure 4:
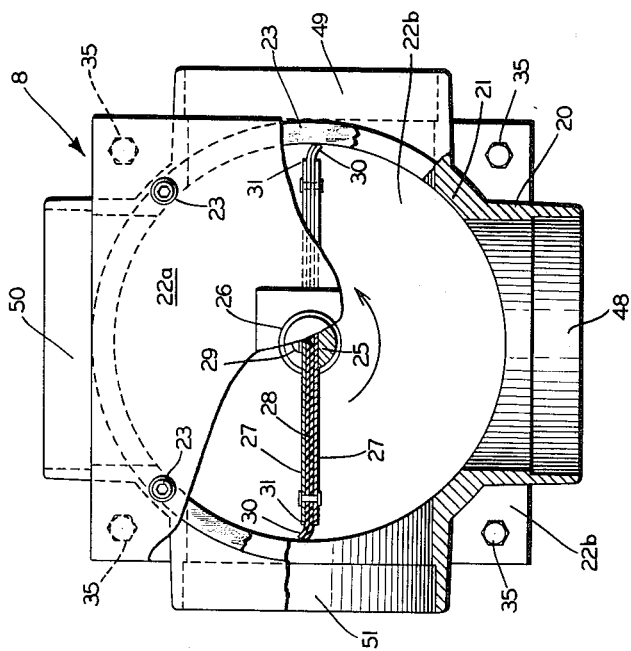
FIG. 4 is an end view with parts in section looking in the direction of the arrows 4—4, FIG. 2.
Figure 5:
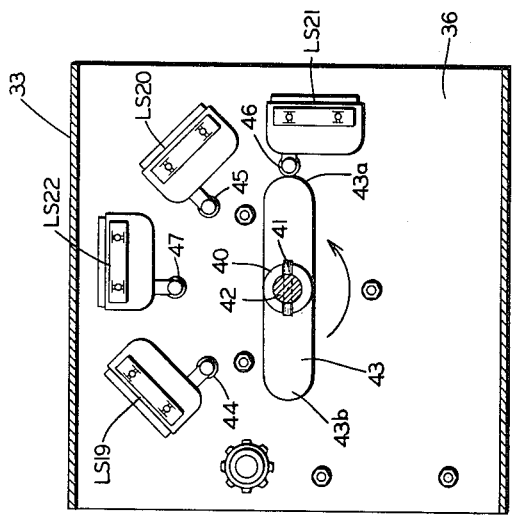
FIG. 5 is a section illustrating the control limit switches and symmetrical double-end control cam looking in the direction of the arrows 5—5, FIG. 2.
Figure 6:
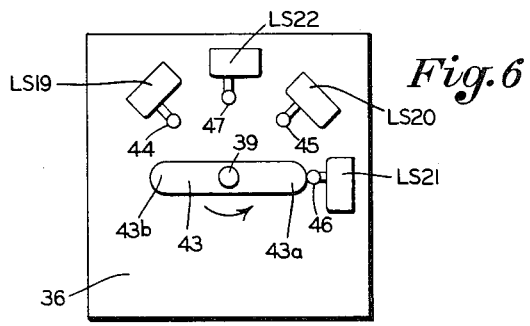
FIGS. 6 and 7 are related diagrammatic views illustrating the valve shutter stopped at one neutral position and the related position of the control cam.

The end of coupling member 40 toward panel portion 36 is provided with an elongated symmetrical double-ended cam member 43 having one rounded end 43a and a similar rounded end 43b spaced 180° from rounded end 43a (FIG. 5). Preferably, the cam 43 extends in a horizontal position as shown in FIG. 5 when shutter plates 27 are in horizontal position as shown in FIG. 4.

A series of limit switches LS19, LS20, LS21 and LS22 are mounted on panel portion 36 (FIG. 5) respectively having contact actuators 44, 45, 46 and 47 located radially opposite the center of rotation of shafts 25 and 42 and spaced 45° apart, as shown in FIG. 5.

Valve body 20 has four openings connected with the interior of the air shifter 8 formed by tubular connector members 48, 49, 50 and 51 which are spaced 90° apart around the periphery of cylindrical valve wall 20.

Referring to FIGS. 1 and 4, tubular connector 48 communicates with the atmosphere; connector 49 communicates through conduit 52 with the intake 53 of blower 54; connector 50 is connected with conduit 7; and connector 51 is connected by conduit 55 with the exhaust outlet 56 of blower 54.

Figure 7:
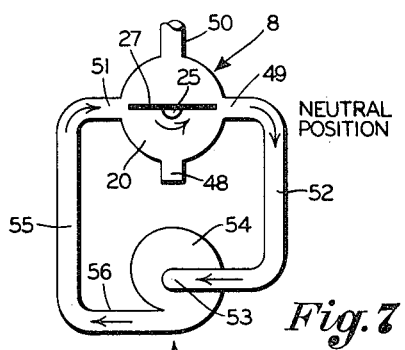

The horizontal position of the shutter 27 as shown in FIGS. 1, 2, 4 and 7 is a "neutral" position as labelled in FIG. 7. When blower 54 is running, shutter 27 straddles openings 49 and 51 and suction from the intake of blower 54 through opening 49 from the valve body 20 is equal to the pressure discharged by blower 54 through outlet 56 and opening 51 into the valve body. Since the suction and pressure are equal, air flow through or from valve body 20 is from opening 51 to opening 49 and the air shifter 8 therefore is neutral with respect to the connection 50 communicating with the pneumatic tube system.

Figure 9:
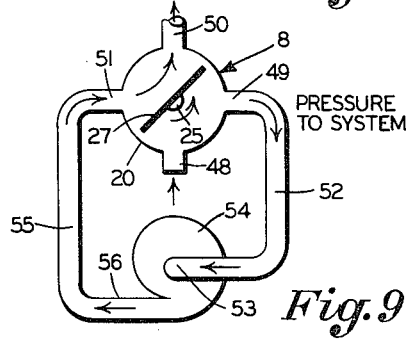

Considering shutter 27 as rotating in a counterclockwise direction viewing FIGS. 4, 7, 9, 11 and 13, the next position of shutter 27 after 45° rotation counterclockwise from the horizontal position of FIG. 7, is shown in FIG. 9. In this position the valving edges of shutter 27 are sealed against the cylindrical valve body wall 21 between openings 49 and 50 and between openings 48 and 51. When blower 54 is running with shutter 27 in the position of FIG. 9, air is drawn into valve body 20 from the atmosphere through opening 48 and is discharged from the valve body opening 49 and conduit 52 to the intake side 53 of blower 54. The blower discharges the air under pressure through exhaust outlet 56, conduit 55 and opening 51 into valve body 20, and then out through opening 50 in a condition of pressure supply to conduit 7 and the pneumatic tube system (FIG. 1). The condition is one of pressure supply to the system, as labelled in FIG. 9, and as indicated by the arrow 57 in FIG. 1.

Figure 11:
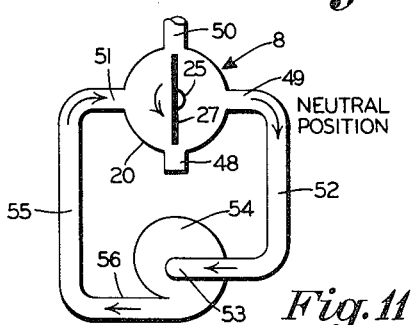

Further rotation of the shutter 27 another 45° from the position of FIG. 9 to that shown in FIG. 11 with the shutter 27 located vertically results in another "neutral" position of the air shifter 8. If blower 54 is running with shutter 27 in the position shown in FIG. 11, any air discharged through opening 51 into the valve body 20 is equal to that withdrawn from valve body 20 through opening 49 and the air shifter 8 therefore is neutral with respect to the connection 50 with the pneumatic tube system.

Figure 13:
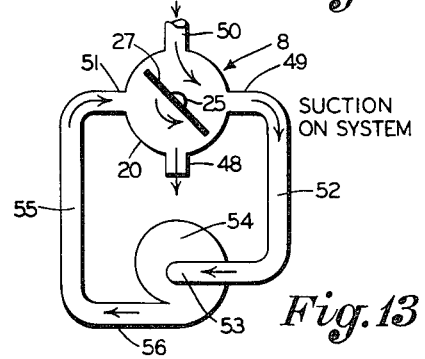

Rotation of shutter 27, an additional 45° from the position shown in FIG. 11 to that shown in FIG. 13, locates shutter 27 with its valving edges interposed between openings 50 and 51 and between openings 48 and 49, respectively, of the valve body. Under this condition and with blower 54 operating, air is drawn into opening 50 of valve body 20 from the conduit 7 connected to the pneumatic tube system, and then passes through opening 49 and conduit 52 to the intake 53 of blower 54, then through exhaust outlet 56 of the blower and conduit 55, through opening 51 and valve body 20 and is discharged to the atmosphere through opening 48. This shutter location is thus one which applies suction to the pneumatic tube system, as labelled in FIG. 13, and as indicated by the arrow 58 in FIG. 1.

Suction 58 on the system will move a carrier from position 16 at kiosk 2 to position 15 at console 1. Pressure 57 on the system will move a carrier from position 15 at console 1 to position 16 at kiosk 2.

Viewing FIGS. 13 and 7, when shutter 27 in the position of FIG. 13 is rotated through an additional 45°, it will be located in the same position as in FIG. 7, that is in a neutral position, but with reversal or transposition of the location of the valving edges of the shutter within the valve body 20.

Thus, shutter 27 starting from the position shown in FIG. 7 and rotating in one direction through 180° passes succesively through a pressure position, a neutral position, a suction position, and a neutral position at each 45° of rotation. This same cycle of operation with the same positions in the order named is repeated when the shutter rotation continues in the same direction through an additional 180°.

As the shutter moves through the two repeated cycles of operation of four positions 45° apart in each cycle, the symmetrical double-ended cam fixed on the drive shaft 39 for the shutter moves through the same relative positions as indicated in FIGS. 6, 8, 10 and 12 as related to FIGS. 7, 9, 11 and 13. During each 45° of rotation of cam 43 from the position of FIG. 6, cam end 43a successively actuates contact actuators 45, 47 and 44 and then cam end 43b actuates contact actuator 46. During further 180° rotation of cam 43, cam end 43b successively actuates contact actuators 45, 47 and 44 and then cam end 43a actuates contact actuator 46 at the position of FIG. 6.

Figure 14:
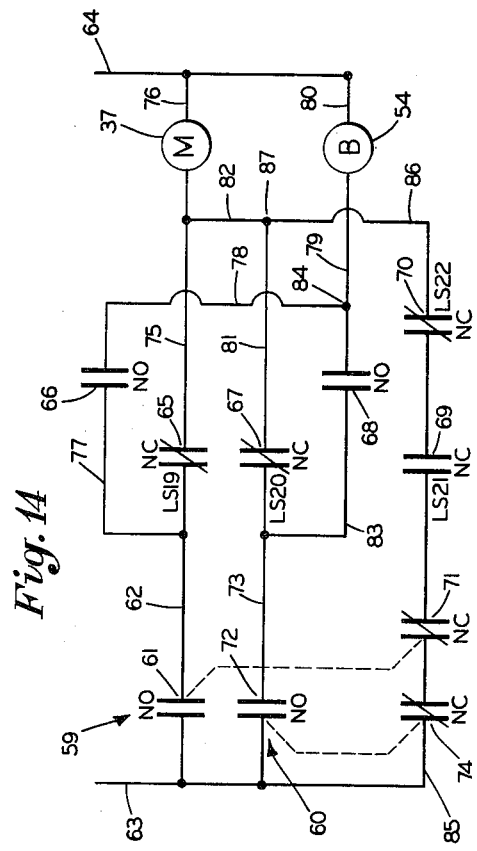
FIG. 14 is a wiring diagram for the control and operation of the air shifter and pneumatic tube system.

The wiring diagram of FIG. 14 shows the manner in which various switches and control components for the air shifter motor 37 and blower 54 are related. A pair of control buttons 59 and 60, are shown in FIG. 1 and are labelled respectively "in" and "out." Pressing "out" button 60 will send a carrier located at console position 15 out to kiosk position 16. Pressing "in" button 59 will send a carrier located at kiosk position 16 in to console position 15. Button 59 actuates normally open contacts 61 in a line 62 connected with one line 63 of power supply, the other power supply line being indicated at 64.

Limit switch LS19 has two sets of contacts, one normally closed indicated at 65 and the other normally open indicated at 66. Limit switch LS20 similarly has two sets of contacts, comprising normally closed contacts 67 and normally open contacts 68. Limit switches LS21 and LS22 each has a single set of normally closed contacts 69 and 70 respectively.

A set of normally closed contacts 71 is controlled by switch actuator 18 at console 1 and contacts 71 are associated with contacts 61 which are actuated by "in" button 59, as indicated in FIG. 14.

"Out" button 60 controls a set of normally open contacts 72 in line 73 connected with power supply line 63. Normally closed contacts 74 controlled by switch actuator 19 at kiosk 2 are associated with contacts 72 controlled by "out" button 60, as indicated in FIG. 14.

Again referring to FIG. 14, line 62 is connected with normally closed contacts 65 of LS19, and then connects through line 75 with air shifter motor 37 and through line 76 with the other side 64 of power supply. A parallel connection 77 runs from line 62 to normally open contacts 66 of LS19, and then through lines 78 and 79 to one side of a motor for blower 54, the other side being connected by line 80 with power line 64.

Line 73 connects with normally closed contacts 67 of LS20 and then through lines 81 and 82 with line 75 to motor 37. A parallel connection 83 runs from line 73 through normally open contacts 68 of LS20 to junction 84 between lines 78 and 79 and thence to blower 54. Another line 85 runs from power line 63 and connects in series the normally closed contacts 74, 71, 69 and 70 and then connects through line 86 with junction 87 between lines 81 and 82 and thence to motor 37.

The improved air shifter construction operates in a manner described below. Assume that a carrier is located at console position 15. Under such circumstances, the carrier arrival actuator switch 18 at console 1 has been tripped and is held tripped as shown in FIG. 1. Shutter 27 is in the neutral position of FIG. 7 and air shifter cam 43 is in the position of FIG. 6 engaging contact actuator 46 of LS21 which, when engaged, holds the normally closed contacts 69 open as shown in FIG. 14.

Now assume it is desired by the teller to send the carrier out from the console 1 to kiosk 2. The teller pushes "out" button 60 which closes the normally open contacts 72 and opens normally closed contacts 74. When contacts 72 are closed, a circuit is established from line 63 through contacts 72, line 73, contacts 67 of LS20, line 81, line 82, motor 37, and line 76 to line 64 which starts the air shifter motor 37 causing rotation of shaft 25.

Figure 8:
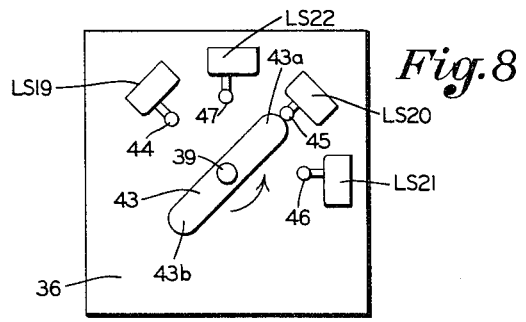
FIGS. 8 and 9 are similar views showing the valve shutter positioned to supply pressure to the pneumatic tube system and the related position of the control cam.
Figure 10:
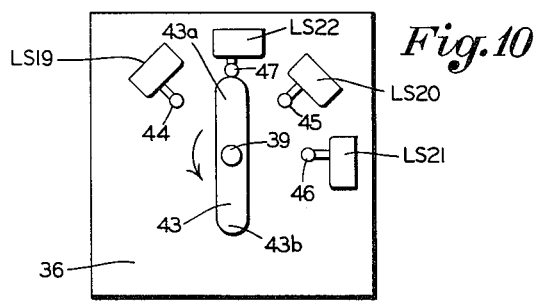
FIGS. 10 and 11 are similar views showing the shutter in another neutral position and the related position of the control cam.

The contacts 69 of LS21 close as soon as cam end 43a moves out of engagement with actuator 46. Air shifter motor 37 continues to run and shaft 25 turns until the position of FIGS. 8 and 9 is reached when cam end 43a engages actuator 45 of LS20 to open the normally closed contacts 67 and close the normally open contacts 68. Opening of contacts 67 stops air shifter motor 37, and closing of contacts 68 establishes a circuit to the motor of blower 54 starting the blower, which supplies pressure to the system as illustrated in FIG. 9 and as indicated by arrow 57 in FIG. 1.

This pressure in the system acts on the carrier which meanwhile has been released from position 15, and the carrier is conveyed through pneumatic tube 3 to the kiosk 2. The carrier upon reaching kiosk position 16 engages carrier arrival switch actuator 19, the actuation of which opens contacts 72 and closes contacts 74. The opening of contacts 72 opens the circuit to the motor of blower 54, stopping the blower. Closing of contacts 74 establishes a circuit from line 63 through contacts 74, 71, 69, 70, line 86, line 82, line 75 and motor 37, and line 76 to line 64 against starting air shifter motor and moving shaft 25 out of the position of FIGS. 8 and 9 to the neutral position of FIG. 11 when cam end 43a engages actuator 47 of LS22.

When LS22 is actuated, its normally closed contacts 70 are opened, opening the circuit to the air shifter motor 37, thus stopping the air shifter motor. Meanwhile, when the cam end 43a disengages actuator 45 of LS20, normally open contacts 68 open and normally closed contacts 67 close.

Figure 12:
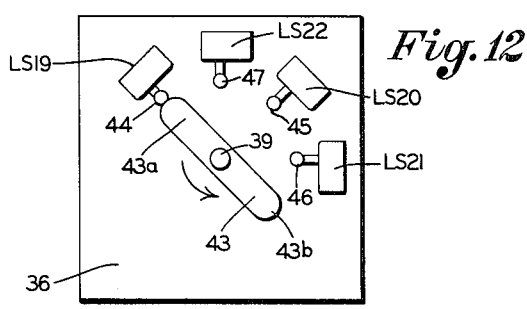
FIGS. 12 and 13 are similar views showing the shutter positioned to supply suction to the pneumatic tube system and the related position of the control cam.

The carrier is now at kiosk position 16 where it will remain until it is desired to return it to console 1. When this is desired, the teller pushes "in" button 59 which closes normally open contacts 61 and opens normally closed contacts 71. Closing of contacts 61 establishes a circuit from line 63 through contacts 61, line 62, normally closed contacts 65 of LS19, line 75 to air shifter motor 37 and line 76 to line 64. This starts the air shifter motor which runs, turning shaft 25 until cam end 43a trips actuator 44 of LS19 as shown in FIG. 12. Contacts 70 of LS22 close as soon as the cam end 43a moves away from actuator 47 upon starting the air shifter motor.

When the actuator 44 of LS19 is engaged, the normally closed contacts 65 of LS19 open and the normally open contacts 66 close. Opening of contacts 65 stops air shifter motor 37 and closing of contacts 66 starts the motor of blower 54 which, with the shutter 25 positioned as shown in FIG. 13, supplies suction to the system as indicated by the arrow 58 in FIG. 1.

Meanwhile, the carrier is released from kiosk position 16 and the suction conveys it to console 1. Upon carrier arrival at console position 15, contact actuator 18 is tripped which opens contacts 61 and closes contacts 71. The opening of contacts 61 opens the circuit through contacts 66 to the motor of blower 54, stopping the blower. With the closing of contacts 71, a circuit is established from line 63 through line 85, contacts 74, 71, 69, and 70 and lines 86 and 82 through air shifter motor 37 to line 64, starting the air shifter motor which moves air shifter shaft 25 until the other end 43b of cam 43 engages actuator 46 of LS21, similar to the manner shown in FIGS. 6 and 7 but with the cam 43 having turned through 180°. Actuation of LS21 opens normally closed contacts 69, as shown in FIG. 14, stopping the air shifter motor. Meanwhile, when the air shifter motor was started and the cam end 43a moved away from actuator 44 of LS19, the normally open contacts 66 of LS19 opened and the normally closed contacts 69 closed.

The air shifter cam 43 is now in position to repeat the cycle of operation whenever it is desired to send a carrier from console position 15 to kiosk position 16 and to then return the carrier from the kiosk 2 to the console 1.

Accordingly, the improved construction provides an arrangement in which the air shifter motor and drive always moves in one direction. Thus, the seals 30 are easy to maintain and the sealing function is easy to provide. The control switches LS19, LS20, LS21 and LS22 may be readily located spaced 45° apart and may be readily adjusted so that their actuator members are engaged by one or the other of the simple rounded ends of cam 43. Adjustments on the switches or repairs to the motor 37 may be performed readily by simply removing the bolted connections 35.

Accordingly, the improved air shifter construction and control for pneumatic tube conveyer systems eliminates difficulties and solves problems that have been encountered in the art and provides a simple air shifter construction which may be assembled, adjusted and maintained with the simplest of operations and which has increased reliability as compared with prior constructions.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact details illustrated because these may be varied without departing from the fundamental principles of the invention.

Having now described the features, discoveries and principles of the invention, the assembly, operation, adjustment and use of a preferred form thereof, and the advantageous, new and useful results obtained thereby; the new and useful discoveries, principles, apparatus, combinations, parts, elements, subcombinations, arrangements, constructions and controls, and mechanical equivalents obvious to those skilled in the art are set forth in the appended claims.

We claim:

1. Rotary air shifter construction for supplying air under pressure or vacuum from a blower to a pneumatic tube conveyer system, including a valve body, a valve shutter having oposite valving edges rotatable in one direction in said valve body, a drive motor connected with the shutter for rotating the shutter in one direction, flexible sealing means at the edges of the shutter engaging the valve body during shutter rotation, the valve body being provided with four openings spaced 90° apart radiating from the center of shutter rotation; the shutter valving edges passing across said four openings successively during shutter rotation, two opposite openings being adapted to communicate one each with the intake and exhaust of a blower, the other two opposite openings being adapted to communicate one each with the atmosphere and a pneumatic tube system; four control limit switches associated with the shutter and connected with a power supply circuit for the shutter drive motor, said switches having contact actuators located 45° apart circumferentially of the axis of shutter rotation, a symmetrical double-ended control cam on the shutter drive shaft, and the ends of the cam successively passing and actuating one after another of said switch actuators during shutter rotation.

2. The construction defined in claim 1 in which the shutter during a complete revolution in one direction twice repeats a cycle of valve operation, in which each cycle comprises shutter stoppage by said limit switches at four successive positions 45° apart, and in which the four positions in order comprise a position supplying pressure to the pneumatic tube, a neutral position, a position supplying vacuum to the tube, and a second neutral position.

3. The construction defined in claim 2, including control means for said motor for starting the motor selectively when the shutter is stopped at either of the neutral positions.

4. Rotary air shifter construction for supplying air under pressure or vacuum from a blower to a pneumatic tube conveyer system, including a valve body, a valve shutter having opposite valving edges rotatable in one direction in said valve body, a drive motor connected with the shutter for rotating the shutter in one direction, flexible sealing means at the edges of the shutter engaging the valve body during shutter rotation; the valve body being provided with a series of openings adapted to communicate respectively with the intake and exhaust of a blower, with the atmosphere, and with a pneumatic tube system; the shutter valving edges passing across one after another of said openings during shutter rotation; a plurality of control limit switches mounted on the valve body connected with a power supply circuit for the shutter drive motor, there being one switch for each position in a cycle of shutter operation; and cam means associated with the shutter and driven by the drive motor actuating the limit switches to control operation of the shutter.

5. Rotary air shifter construction for supplying air under pressure or vacuum from a blower to a pneumatic tube conveyer system, including a valve body, a valve shutter having opposite valving edges rotatable in one direction in said valve body, a drive motor connected with the shutter for rotating the shutter in one direction, flexible sealing means at the edges of the shutter engaging the valve body during shutter rotation; the valve body being provided with a plurality of openings spaced 90° apart radiating from the center of shutter rotation, said openings being adapted to communicate respectively with the intake and exhaust of a blower, with the atmosphere, and with a pneumatic tube system; the shutter valving edges passing across said openings successively during shutter rotation; four control limit switches associated with the shutter and connected with a power supply circuit for the shutter drive motor, cam means connected with the shutter and driven by said drive motor, the shutter having four operative positions in rotating through 180°, the cam means and control switches stopping said shutter at each of said four operative positions; and the shutter repeating stoppage at said four operative positions in rotating through another 180° during a complete 360° revolution of the shutter.

6. The construction defined in claim 5 in which the shutter is mounted on a shaft operatively connected with the drive motor, in which the cam is mounted on the shutter shaft, in which the cam has two similar cam lobes spaced 180° apart, and in which the cam lobes alternately engage and actuate the limit switches in the repeated four shutter-position operation of the shutter during a complete 360° revolution of the shutter.

References Cited by the Examiner
UNITED STATES PATENTS

| | | | |
|---|---|---|---|
| 974,799 | 11/1910 | Jacques | 243—7 |
| 1,032,141 | 7/1912 | Jennings | 243—2 |
| 1,102,765 | 6/1914 | Pearsall | 243—7 |

SAMUEL F. COLEMAN, *Primary Examiner.*